Oct. 23, 1956     A. JOHNSON     2,768,017
TONGS FOR LIFTING PANS OR THE LIKE
Filed April 12, 1955
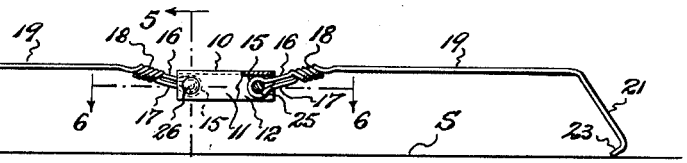
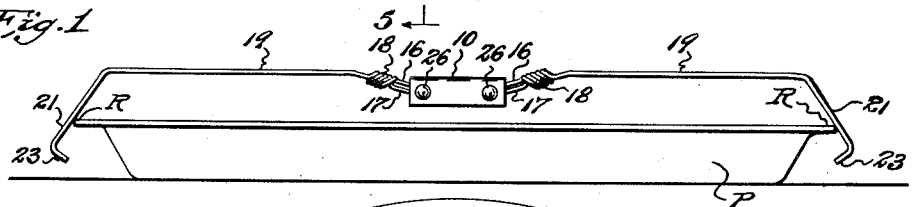
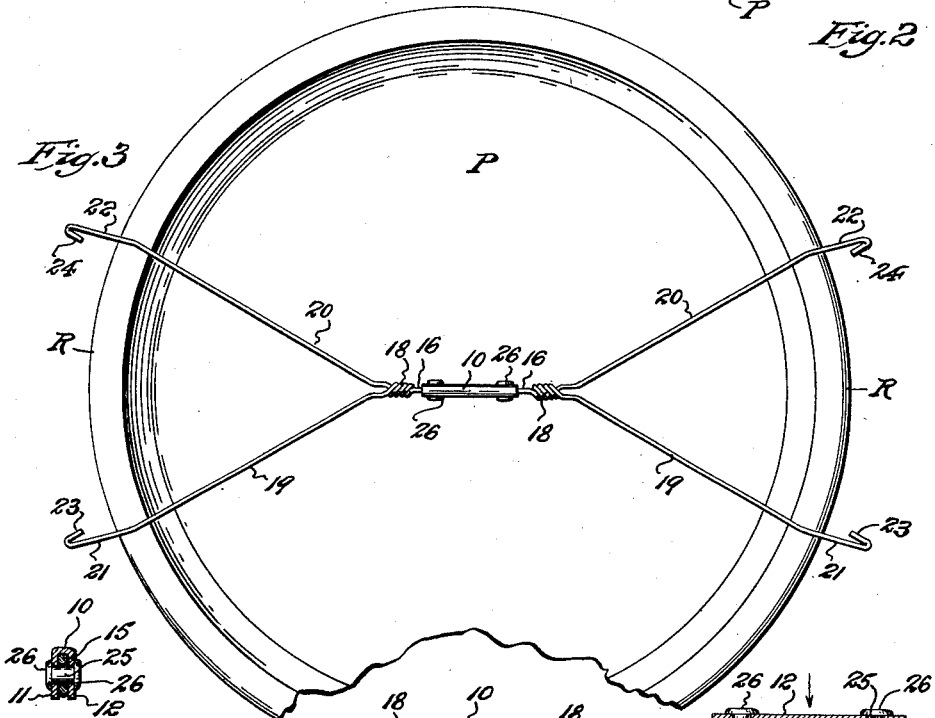
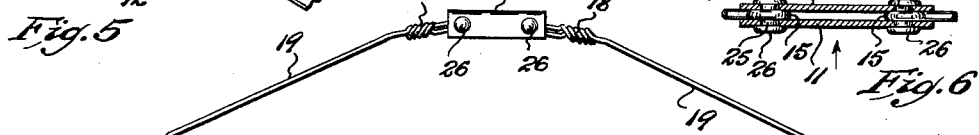
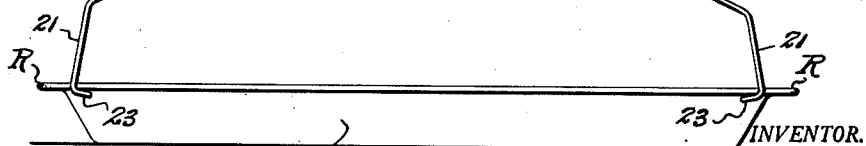
INVENTOR.
Andrew Johnson,
BY George D. Richards,
Attorney United States Patent Office 2,768,017
Patented Oct. 23, 1956

2,768,017

TONGS FOR LIFTING PANS OR THE LIKE

Andrew Johnson, Butte, Mont.

Application April 12, 1955, Serial No. 500,803

3 Claims. (Cl. 294—31)

This invention relates to an improved construction of lifting and transporting tongs suitable for application to a pan or the like, whereby to provide means for lifting and moving the same from one place to another, especially when the pan or the like is too hot to be directly manually handled.

The invention has for an object to provide an easily manipulatable lifting tongs device of simple and inexpensive construction, which comprises oppositely extending grapple members, which are respectively pivotally connected to opposite ends of a medial finger piece or hand hold by which the device can be operatively manipulated.

The invention has for a further object to provide a lifting tongs device, the grapple members of which are respectively produced from a length of stiff metallic wire or rod stock, which is doubled and twisted upon itself to form a hinging loop or eye at its inner end, and from which outwardly extend divergent grapple arms terminating at their free ends in pan engageable hooks; the hinging loops or eyes being pivotally engaged with a medial finger piece or hand hold of U-shaped cross-section, between the sides thereof; said finger piece or hand hold being made of springy sheet material, whereby its side portions can be manually yieldably pinched or pressed one toward the other, so as to frictionally bind against the interposed hinging loops or eyes, when it is desired to temporarily hold the grapple members in upswung spread condition against pivotal movement relative to said finger piece or hand hold, and thus positioned for convenient straddling application to a pan or the like desired to be engaged thereby, and yet free to pivot for down swinging movement relative to the finger piece or hand hold so as to engage the hooks of said grapple members beneath the rim or lip of a pan, when manual squeezing pressure upon the finger piece or hand hold is relaxed.

The above and other objects will be understood from a reading of the following detailed description of this invention with reference to the accompanying drawings, in which:

Fig. 1 is a side elevational view of the lifting tongs device of this invention showing the grapple members thereof pressed downwardly against a flat surface, whereby to spread the same to an upswung initial open condition; Fig. 2 is a similar view showing the spread grapple members of the lifting tongs device applied in straddling relation to a pan preparatory to operative engagement thereof with the latter; and Fig. 3 is a plan view of the same.

Fig. 4 is a side elevational view of the lifting tongs device as operatively engaged with a pan, ready to lift and move the latter.

Fig. 5 is a detail cross-sectional view, taken on line 5—5 in Fig. 1, but drawn on an enlarged scale; and Fig. 6 is a fragmentary horizontal sectional view, taken on line 6—6 in Fig. 1, also drawn on an enlarged scale.

Referring to the drawings, in which corresponding characters of reference indicate like parts, the reference character 10 indicates the finger piece or hand hold of the lifting tongs device. This finger piece or hand hold is produced from a preferably rectangular blank of springy sheet metal, or other springy sheet material, which is doubled crosswise upon itself to form a substantially rectangular, hollow endwise open body of U-shape in cross-section, thus providing opposite side wall portions 11 and 12 which are laterally spaced apart at a distance equal to the cross-sectional diameter of the metallic wire or rod stock from which the below prescribed grapple members of the lifting tongs device are produced.

Each grapple member is produced from a length of stiff metallic wire or rod stock, which is doubled upon itself and shaped, at the resultant doubled end, to provide a substantially circular hinging eye 15, from the outward side of which extend parallel portions 16 and 17 of the wire or rod stock which are disposed in a perpendicular plane. Outlying parts of said parallel portions 16 and 17 are twisted or spirally convolved one about the other to provide an interlock section 18 which closes the hinging eye 15. Outwardly of this interlock section 18, one wire or rod stock portion, e. g., the portion 16, extends to provide a grapple arm 19, and the other wire or stock portion, e. g. the portion 17, extends to provide a companion grapple arm 20. These grapple arms 19 and 20 are disposed in relatively divergent relationship and so as to lie in a common transverse and preferably somewhat downwardly and outwardly inclined plane, and the same preferably, but not essentially, respectively terminate in respective down-turned jaw forming end portions 21 and 22 disposed at an obtuse angle divergent to the plane of the grapple arms. These jaw forming end portions 21 and 22 respectively terminate at their free ends in respective in-turned hook elements 23 and 24. It will be understood that said jaw forming end portions may be omitted, in which case the hook elements 23 and 24 will be disposed in connection with the terminal free ends of the grapple arms 19 and 20.

To assemble the grapple members in pivotally attached relation to the finger piece or hand hold 10, the hinging eyes 15 are inserted through the open ends of the latter, so as to lie between the side wall portions 11 and 12 adjacent to said open ends; whereupon hinging pins 25 are passed through said side wall portions 11 and 12 and the intermediate hinging eyes 15. Suitable means is provided for retaining the hinging pins against displacement, for example, the outer ends of said pins can be riveted over the outer surfaces of said side wall portions 11 and 12 of the finger piece or hand hold, thereby forming heads 26 which function to hold the hinging pins in place.

Preparatory to use of the lifting tongs device, the grapple members thereof are upswung relative to the finger piece or hand hold 10, whereby to spread said grapple members to an open condition, so that the distance between the hook elements 23—24 of the oppositely extending grapple members is greater than the maximum diameter of a pan P to which the lifting tongs is desired to be applied.

To so condition the lifting tongs device, the finger piece or hand hold is grasped between thumb and fingers of the operator's hand without exerting squeezing pressure thereupon, whereupon the grapple members can be pushed down against a table top or other flat surface S (see Fig. 1), whereby to spread the grapple members to required open positions.

The grapple members having been thus spread to open condition, before raising the tongs device away from the surface S, the operator exerts, by the grasping thumb and fingers, inward squeezing pressure against the side wall portions 11 and 12 of the finger piece or hand hold 10 in the directions of the arrows shown in Fig. 6. Such applied squeezing pressure strongly presses the respective side wall portions 11 and 12 of the finger piece or hand hold 10 against opposite sides of the interposed hinging eyes 15 of the grapple members, thereby effecting a strong frictional binding thereof against said side wall portions 11 and 12 which inhibits pivotal movement thereof, and thus prevents down swinging displacement of the grapple members from their spread open positions. This having been done, the tongs device can be lifted away from the surface S, while maintaining the spread open positions of the grapple members, whereupon the tongs device can be applied across a pan P in straddling relation thereto (see Figs. 2 and 3).

The tongs device having been thus laid across the pan P, the operator thereupon relaxes squeezing pressure upon the finger piece or hand hold, thereby releasing the hinging eyes 15 from the binding friction thereof, so that said hinging eyes are free for normal pivoting movement relative to the finger piece or hand hold 10, whereupon the operator raises the finger piece or hand hold, so that the grapple members can swing downward and inward to engage their hook elements 23—24 beneath the rim or lip R of the pan P (see Fig. 4). After this, by continuing to raise the tongs device, the pan P can be lifted by the latter and carried thereby to a desired place of deposit.

To release the tongs device from the pan P, the finger piece or hand hold 10 is lowered, so as to spread the grapple members against the pan to open positions which disengage the hook elements 23—24 from the pan rim or lip R, whereupon, by again exerting squeezing pressure upon the finger piece or hand hold 10, the spread grapple members will again be bound against pivotal movement while the tongs device is lifted away from the pan.

From the above, it will now be understood that the instant invention provides a very simple and inexpensive construction of lifting tongs device adapted to function by such novel mode of operation that the same can be easily manipulated by the user for application to or removal from a pan or the like desired to be moved thereby.

Having now described my invention, I claim:

1. A lifting tongs device comprising a medial finger piece formed from springy sheet material to provide a body of endwise open U-shape having spaced apart side wall portions which are yieldable to lateral compression, a pair of grapple members to respectively extend from opposite ends of said finger piece, each grapple member having a hinging eye at its inner end disposed in the vertical plane of said finger piece and entered in an open end of the latter between said side wall portions thereof, externally headed hinge pins to pivotally connect said hinging eyes to the finger piece, and said side wall portions of the finger piece being resiliently yieldable to applied lateral squeezing pressure whereby to frictionally bind said hinging eyes against pivotal movement so as to releasably hold the grapple members in upswung spread open positions at will.

2. A lifting tongs device comprising a medial finger piece formed from springy sheet material to provide a body of endwise open U-shape having spaced apart side wall portions which are yieldable to lateral compression, a pair of grapple members to respectively extend from opposite ends of said finger piece, each grapple member having a hinging eye at its inner end disposed in the vertical plane of said finger piece and entered in an open end of the latter between said side wall portions thereof, externally headed hinge pins to pivotally connect said hinging eyes to the finger piece, said side wall portions of the finger piece being resiliently yieldable to applied lateral squeezing pressure, whereby to frictionally bind said hinging eyes against pivotal movement so as to releasably hold the grapple members in upswung spread open positions at will, each grapple member comprising divergent grapple arms disposed in a downwardly and outwardly inclined plane transverse to the vertical plane of the finger piece, means to interlock inner end portions of said arms together outwardly of the hinging eye of the grapple member, and said grapple arms terminating in angularly inturned hook elements.

3. A lifting tongs device comprising a medial finger piece formed from springy sheet material to provide a body of endwise open U-shape having spaced apart side wall portions which are yieldable to lateral compression, a pair of grapple members to respectively extend from opposite ends of said finger piece, each grapple member comprising a length of wire stock doubled upon itself, the doubled end portion being twisted upon itself and shaped to provide an inner hinging eye disposed in a vertical plane and divergent outwardly extending grapple arms disposed in a downwardly and outwardly inclined plane perpendicular to the plane of the hinging eye, said grapple arms terminating in angularly inturned hook elements, the hinging eyes of respective grapple members being entered in opposite open ends of the finger piece between the side walls thereof, and externally headed hinge pins to pivotally connect said hinging eyes to the finger piece, the side wall portions of the finger piece being resiliently yieldable to applied lateral squeezing pressure, whereby to engage and frictionally bind said hinging eyes against pivotal movement so as to releasably hold the grapple members in upswung spread open position at will.

References Cited in the file of this patent

UNITED STATES PATENTS

| | | |
|---|---|---|
| 583,063 | Martinie | May 25, 1897 |
| 916,175 | Magone | Mar. 23, 1909 |
| 1,429,446 | Morgan | Sept. 19, 1922 |

FOREIGN PATENTS

| | | |
|---|---|---|
| 21,958 | Great Britain | Oct. 12, 1904 |